(12) United States Patent
Yamada et al.

(10) Patent No.: US 8,991,581 B2
(45) Date of Patent: Mar. 31, 2015

(54) HIGHLY REACTIVE FLUID FAN COUPLING DEVICE

(75) Inventors: Masato Yamada, Shizuoka (JP); Hiroki Sugawara, Shizuoka (JP)

(73) Assignee: Usui Kokusai Sangyo Kaisha Limitd, Shizuoka (JP)

( * ) Notice: Subject to any disclaimer, the term of this patent is extended or adjusted under 35 U.S.C. 154(b) by 153 days.

(21) Appl. No.: 13/641,827

(22) PCT Filed: Apr. 20, 2011

(86) PCT No.: PCT/JP2011/059720
§ 371 (c)(1),
(2), (4) Date: Oct. 17, 2012

(87) PCT Pub. No.: WO2011/136102
PCT Pub. Date: Nov. 3, 2011

(65) Prior Publication Data
US 2013/0037371 A1 Feb. 14, 2013

(30) Foreign Application Priority Data
Apr. 28, 2010 (JP) ................................ 2010-104401

(51) Int. Cl.
*F16D 35/02* (2006.01)
(52) U.S. Cl.
CPC ................... *F16D 35/024* (2013.01)
USPC ....................... 192/58.61; 192/58.5
(58) Field of Classification Search
USPC .......................... 192/58.61, 58.63, 58.5, 58.7
See application file for complete search history.

(56) References Cited

U.S. PATENT DOCUMENTS

| | | | | |
|---|---|---|---|---|
| 3,217,849 A | * | 11/1965 | Weir | 192/82 R |
| 4,437,554 A | * | 3/1984 | Haeck | 192/58.62 |
| 4,930,457 A | | 6/1990 | Tamai | |
| 4,940,121 A | * | 7/1990 | Digele | 192/58.681 |
| 5,452,782 A | * | 9/1995 | Inoue | 192/58.63 |

(Continued)

FOREIGN PATENT DOCUMENTS

| | | |
|---|---|---|
| JP | 63-21048 | 5/1988 |
| JP | 1-102526 | 7/1989 |

(Continued)

OTHER PUBLICATIONS

International Search Report of Jun. 14, 2011.

*Primary Examiner* — Gene Crawford
*Assistant Examiner* — Ryan Dodd
(74) *Attorney, Agent, or Firm* — Gerald E. Hespos; Michael J. Porco; Matthew T. Hespos

(57) ABSTRACT

Provided is a highly reactive fluid fan coupling device utilizing the non-Newtonian fluid characteristics of oil, thereby obtaining an excellent reaction rate of fan rotation using a control signal. In the fan coupling device, where the interior of a sealed housing supported on a rotary shaft with a drive disk secured thereto is partitioned in an oil reservoir chamber and a torque transmission chamber placing the drive disk thereinto by a partition plate; drive torque is transmitted to a driven side by oil supplied to the torque transmission chamber; and opening and closing of a flow path of oil is controlled by a valve member actuated by an electromagnet, wherein a mechanism to scrape out the oil in the oil reservoir chamber utilizing the non-Newtonian fluid characteristics of oil is provided on the drive disk so as to be opposed to an oil supply adjusting hole of the partition plate.

11 Claims, 7 Drawing Sheets

(56) References Cited

U.S. PATENT DOCUMENTS

| | | | |
|---|---|---|---|
| 6,443,283 B1 * | 9/2002 | Augenstein et al. | 192/58.61 |
| 6,550,596 B2 | 4/2003 | Shiozaki et al. | |
| 6,807,926 B2 | 10/2004 | Shiozaki et al. | |
| 6,915,888 B2 * | 7/2005 | Shiozaki et al. | 192/58.61 |
| 7,387,591 B2 | 6/2008 | Shiozaki | |
| 8,118,148 B2 | 2/2012 | Shiozaki et al. | |

FOREIGN PATENT DOCUMENTS

| | | |
|---|---|---|
| JP | 3-61727 | 3/1991 |
| JP | 2002-81466 | 3/2002 |
| JP | 2003-239741 | 8/2003 |
| JP | 2004-340373 | 12/2004 |
| JP | 2006-112466 | 4/2006 |

* cited by examiner

HIGHLY REACTIVE FLUID FAN COUPLING DEVICE

BACKGROUND OF THE INVENTION

1. Field of the Invention

The present invention relates to a fluid fan clutch of a system in which fan rotation for engine cooling in an automobile or the like is controlled, according to a change in ambient temperature or in the rotation, and in particular to a highly reactive fluid fan coupling device that achieves speeding up of a reaction of fan rotation with the use of a control signal.

2. Description of the Related Art

Conventionally, a fan coupling device that controls fan rotation for engine cooling in an automobile or the like to supply the engine with cooling air is of a temperature-sensitive type, an externally-controlled type, or the like. In an example of the temperature-sensitive type, the inside of a sealed housing composed of a case and a cover is partitioned in an oil reservoir chamber and a torque transmission chamber with a drive disk therein by a partition plate having an oil supply adjusting hole, a dam is formed in a portion of an inner circumferential wall of the sealed housing opposite an outer circumferential wall portion of the drive disk for collecting and reservoiring oil at a rotating time, a circulating flow passage continuing from the dam is formed between the torque transmission chamber and the oil reservoir chamber, and a valve member opening the supply adjusting hole of the partition plate when the external ambient temperature or the like exceeds a set value and closing the supply adjusting hole of the partition plate at equal to or less than the set value is provided inside, and the effective contact area of the oil in a torque transmission clearance provided between the drive disk and an opposite wall face near the outside of the sealed housing is increased/decreased, thereby controlling torque transmission from a drive side to the sealed housing on a driven side. The fan coupling device of this type generally detects an atmospheric temperature using a bimetallic strip or a bimetallic coil, thereby adjusting the opening degree of the oil supply adjusting hole according to this detection value (see Japanese Patent Publication No. S63-21048). In addition, the externally-controlled type has the same basic structure as that of the temperature-sensitive fan coupling device, but in the externally-controlled type, a valve member, which opens and closes the oil supply adjusting hole of the partition plate, is made of a magnetic material, and the valve member with magnetic property is controlled by an electromagnet located outside, and in the valve control structure, for example, a pair of electromagnets are located on a front face side of the sealed housing or on a rear face side thereof, and a valve member with magnetic property which opens and closes the oil supply adjusting hole of the partition plate is located opposite the electromagnets (see Japanese Patent Application Laid-Open No. H03-61727, Japanese Patent Application Laid-Open No. 2002-81466, Japanese Patent Application Laid-Open No. 2003-239741, Japanese Patent Application Laid-Open No. 2004-340373 and Japanese Patent Application Laid-Open No. 2006-112466, etc.).

In the conventional fan coupling devices described above, since such a mechanism is adopted that the drive torque of the drive disk is transmitted to the sealed case by the oil supplied from the oil reservoir chamber to the torque transmission chamber through the oil supply adjusting hole of the partition plate so that the fan attached to the sealed housing is rotated, the oil supply adjusting hole that is opened and closed by the valve member is located on the driven side. Therefore, in the conventional fluid-type fan coupling device of this type, the centrifugal force decreases during low fan rotation (OFF rotation), and the oil supply amount decreases accordingly, so that there is the disadvantage that it takes time to rotate the fan at high speed due to a slow reaction when the fan rotation is to be increased. Furthermore, in a snowplow (a vehicle provided with a blade for snow removal in front of the front grille), the wind speed in front of the front grille becomes lower than the wind speed around the front grille, and a pressure difference occurs between inside the engine room and around the front grille, or a swirling-up wind from the bottom causes a stream of wind in the opposite direction from the fan, thereby reducing the fan rotation significantly, so that there is the disadvantage that the fan rotation does not increase due to a slow reaction or no reaction when the fan rotation is to be increased, resulting in overheating.

The present invention has been made in order to overcome the above disadvantages of the conventional fluid fan coupling devices, and an object thereof is to provide a highly-reactive fluid fan coupling device that utilizes the non-Newtonian fluid characteristics of oil to obtain an excellent reaction rate of fan rotation with the use of a control signal.

SUMMARY OF THE INVENTION

The highly reactive fluid fan coupling device according to the present invention has such a configuration that a drive disk in a torque transmission chamber is provided with an oil scraping mechanism utilizing the non-Newtonian fluid characteristics of oil. The gist of the present invention lies in a fan coupling device where an interior of a sealed housing supported through a bearing on a rotary shaft to which a drive disk fixed at a distal end of the rotary shaft is partitioned into an oil reservoir chamber and a torque transmission chamber placing the drive disk thereinto by a partition plate having an oil supply adjusting hole; a dam is formed in a portion of an inner circumferential wall of the sealed housing opposite an outer circumferential wall portion of the drive disk for collecting and reservoiring oil at a rotating time, and continuing from the dam, an oil circulating flow passage is formed between the torque transmission chamber and the oil reservoir chamber; a valve member is provided, the valve member opening the oil supply adjusting hole of the partition plate when the external ambient temperature exceeds a set value and closing the oil supply adjusting hole when the external ambient temperature is equal to or less than the set value; and rotation torque transmission from a drive side to a driven side is controlled by increasing/decreasing an effective contact area of oil in a torque transmission clearance formed between the drive side and the driven side, wherein a mechanism to scrape out the oil in the oil reservoir chamber by utilizing the non-Newtonian fluid characteristics of oil is provided on the drive disk so as to be opposite the oil supply adjusting hole of the partition plate.

It should be noted that the motion of a Newtonian fluid acts only in the direction of force application, which results in oil disperse cavitation (oil film loss), but the motion of a non-Newtonian fluid simultaneously acts vertically and horizontally as well as in the direction of force application, which therefore does not cause oil disperse cavitation (oil film loss) (this is a non-Newtonian fluid characteristic).

The mechanism to scrape out the oil in the oil reservoir chamber according to the present invention is composed of a ring or a ring-like protrusion provided integrally or separately on a rear face of the drive disk. The ring or the ring-like protrusion has a flat face on the opposite side of the oil supply adjusting hole of the partition plate and is separated from the partition plate with a desired clearance (gap). In addition, as a preferred aspect, the ring or the ring-like protrusion has a radial groove in the flat face opposite the oil supply adjusting hole of the partition plate, and furthermore, the ring or the ring-like protrusion can be made of metal, synthetic resin, or rubber (for example, a fluorine-containing rubber or the like).

It should be noted that a smaller clearance (gap) provided between the ring or the ring-like protrusion and the partition plate basically increases shear force (frictional force), and therefore the reaction is improved. In view of the reactivity, the optimum value of this clearance (gap) is, it is not particularly limited, preferably between about 0.3 to 0.7 mm. This is because if the clearance (gap) is less than 0.3 mm, the supply of a large amount of oil due to centrifugal force during high-speed fan rotation is prevented by the ring or the ring-like protrusion adjacent to the oil supply adjusting hole of the partition plate, and therefore the oil may not supplied enough to reach the maximum speed of rotation, on the other hand, if the clearance (gap) exceeds 0.7 mm, the oil scraping effect due to shear force between the ring or the ring-like protrusion and the oil is significantly reduced, and therefore the effect to increase the reaction rate when the fan rotation is speeding up cannot be expected.

In the highly reactive fluid fan coupling device according to the present invention, the drive disk in the torque transmission chamber is provided with the oil scraping mechanism utilizing the non-Newtonian fluid characteristic of oil and thereby oil in the oil reservoir chamber is scraped out by the function of the ring or the ring-like protrusion rotating integrally with the drive disk, so that a supply amount of oil to the torque transmission chamber is increased even during low fan rotation, which makes it possible to achieve an excellent effect to speed up the reaction of fan rotation using a control signal, and further there is the advantage that the ring or the ring-like protrusion constituting the oil scraping mechanism can be easily applied to an existing fan coupling device without an increase in cost.

BRIEF DESCRIPTION OF DRAWINGS

FIG. 4A showing a flat face, FIG. 4B showing a flat face formed with radial grooves therein, FIG. 4C showing a flat face formed with radial protrusions thereon, and FIG. 4D showing a flat face formed with a labyrinth therein.

FIG. 5A being enlarged sectional views showing a cross-section structure having a slope obtained by obliquely cutting an outer end of a face of the ring or the ring-like protrusion opposite the oil supply adjusting hole of the partition plate, and FIG. 5B being enlarged sectional views showing a cross-section structure having a step obtained by cutting an outer end of a face of the ring or the ring-like protrusion opposite the oil supply adjusting hole of the partition plate in a stepping fashion.

DETAILED DESCRIPTION OF THE PREFERRED EMBODIMENTS

Figure 1:
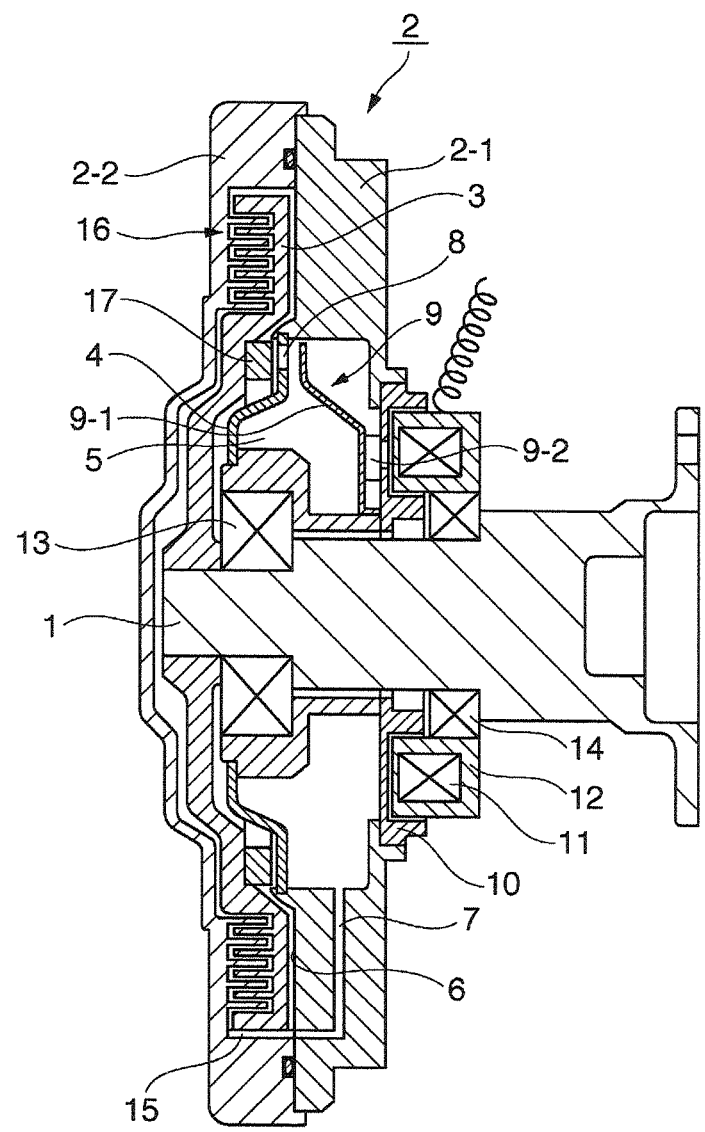
FIG. 1 is a vertical sectional side view showing an embodiment of a highly reactive fluid fan coupling device according to the present invention.

In a highly reactive fluid fan coupling device (externally-controlled type) shown in FIG. 1, a sealed housing 2 composed of a case 2-1 and a cover 2-2 is supported through a bearing 13 on a rotary shaft (drive shaft) 1 rotating by drive of a drive section (an engine), and the interior of the sealed housing 2 is partitioned in an oil reservoir chamber 5 and a torque transmission chamber 6 by a partition plate 4 having an oil supply adjusting hole 8, a drive disk 3 fixed to a distal end of the rotary shaft 1 and having a comb-like wall near the outer periphery of a front face of a distal end of the drive disk 3 is housed in the torque transmission chamber 6, and the drive disk 3 has a narrow clearance for torque transmission through a labyrinth mechanism 16 located between the comb-like wall provided at the distal end of the drive disk 3 and the case 2-1 behind the drive disk 3. It should be noted that a dam 15 is provided in a part of an inner circumferential wall of the cover 2-2 opposite an outer circumferential wall portion of the drive disk 3 for collecting and reservoiring oil during rotation.

The case 2-1 is provided with a circulating flow passage 7 for oil collection, a valve member 9 for oil supply that opens and closes the oil supply adjusting hole 8 formed in the partition plate 4 is composed of a leaf spring 9-1 and an armature 9-2, and a proximal end of the leaf spring 9-1 is attached to the case 2-1.

On a drive side of the sealed housing 2, a ring-like electromagnet 11 is supported in a ring-like electromagnet support 12 that is supported on the rotary shaft 1 through a bearing 14 and fixed to an external member such as an engine block, and a disk-like magnetic loop element (a magnetic body) 10 with a ring portion built in the case 2-1 is attached opposite the armature 9-2 of the valve member, and further a portion of the electromagnet support 12 is fitted to the magnetic loop element 10 in a concavo-convex fashion. It should be noted that in this embodiment, in order to transmit efficiently the magnetic flux of the electromagnet 11 to the armature 9-2 of the valve member, the disk-like magnetic loop element 10 having a ring portion is used to configure an actuation mechanism of the valve member 9 for oil supply.

Figure 2:
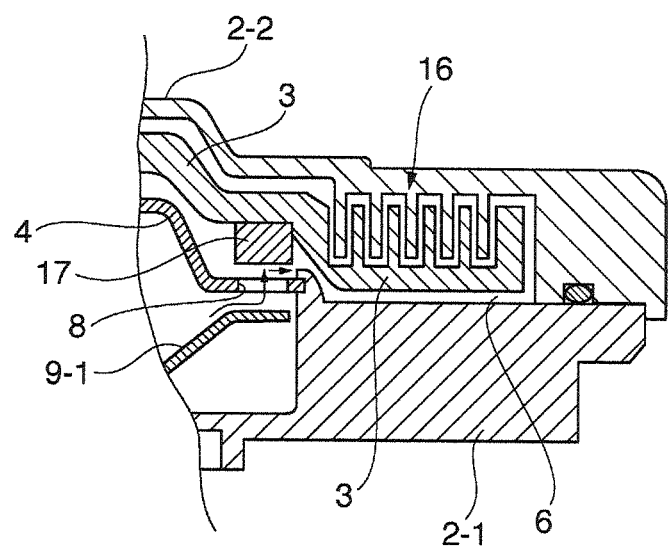
FIG. 2 is a vertical sectional side view showing an enlarged important part of the same device in an enlarging fashion.
Figure 3:
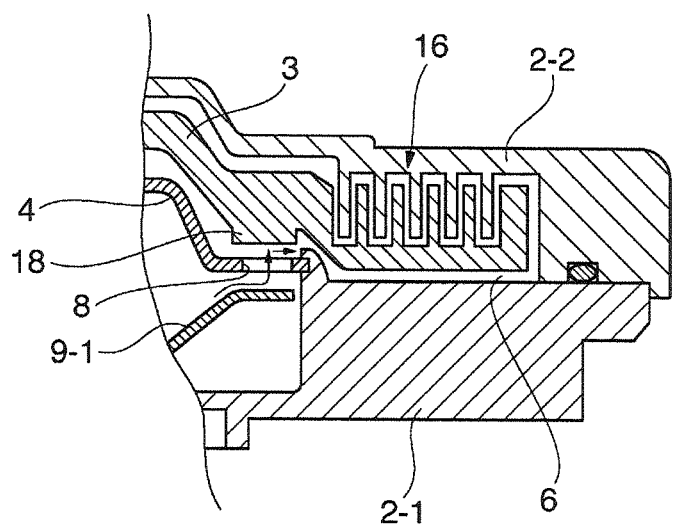
FIG. 3 is a view showing a part corresponding to the part shown in FIG. 2 of another embodiment of the present invention.

In the present invention, the drive disk 3 of the fan coupling device thus configured includes a mechanism utilizing the non-Newtonian fluid characteristics of oil to scrape out the oil in the oil sump chamber 5 provided so as to be opposed to the oil supply adjusting hole 8 of the partition plate 4, and the oil scraping mechanism is composed of a ring 17 provided on a rear face of the drive disk 3 separately from the drive disk 3 or a ring-like protrusion 18 integrated therewith, as a main feature, as shown in FIGS. 1 to 3.

The ring 17 of an example shown in FIGS. 1 and 2 has a doughnut-like shape having a flat face opposite the oil supply adjusting hole 8 of the partition plate 4, and secured to the rear face of the drive disk 3 with a clearance (gap) of about 0.3 mm to 0.7 mm between the ring 17 and the partition plate 4 as described above. In addition, a securing means of this ring depending on the material of the ring, but welding or brazing can be employed when the ring is made of metal, and press-fitting, bonding or the like can be employed when the ring is made of synthetic resin or rubber. It should be noted that, of course, the thickness or size (diameter, inner diameter, or the like) of the ring is properly set so as to adapt to the structure, size or the like of the fan coupling device, such as the gap between the drive disk 3 and the partition plate 4 of a fan coupling device to be applied or the size of the torque transmission chamber 6.

In addition, the ring-like protrusion 18 shown in FIG. 3 is an example where the ring-like protrusion 18 is provided on the rear face of the drive disk 3 integrally with the drive disk 3, and this ring-like protrusion 18 also has a flat face opposite the oil supply adjusting hole 8 of the partition plate 4, and is formed on the rear face of the drive disk 3 with a clearance (gap) of about 0.3 mm to 0.7 mm between the ring-like protrusion 18 and the partition plate 4, as described above.

Figure 4A:
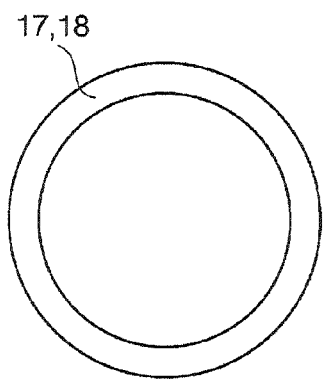
FIGS. 4A to 4D are plan views of exemplary shapes of a face of a ring or a ring-like protrusion of the present invention positioned opposite an oil supply adjusting hole of a partition plate.
Figure 4B:
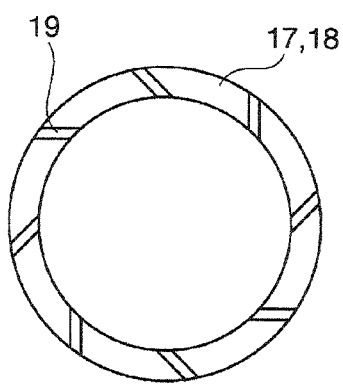
Figure 4C:
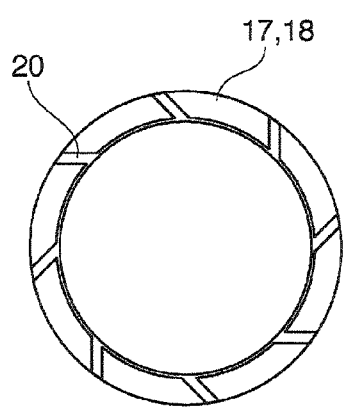
Figure 4D:
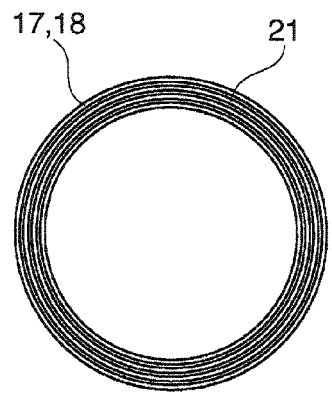

A face of the ring 17 provided on the rear face of the drive disk 3 as a member separated from the drive disk 3 or of the ring-like protrusion 18 provided thereon integrally with the drive disk 3, which face is opposed to the oil supply adjusting hole 8 of the partition plate 4, can be formed into shapes shown by way of example in FIGS. 4A to 4D. These shapes take into consideration an oil scraping effect due to the function of the ring 17 or the ring-like protrusion 18, FIG. 4A showing a plain flat face as described above; FIG. 4B showing a flat face formed with radial grooves 19 therein; FIG. 4C showing a flat face formed with radial protrusions 20 thereon; FIG. 4D showing and a flat face formed with a labyrinthine groove 21 therein. Among these shapes, the flat face formed with radial grooves 19 therein, shown in FIG. 4B, has turned out experimentally to have the largest oil scraping effect. This is thought to be because in the ring 17 or the ring-like protrusion 18 whose face opposite the oil supply adjusting hole 8 of the partition plate 4 is formed with the radial grooves 19, not only the area opposite the oil supply adjusting hole 8 increases, but also the function of scraping out the oil to the outside of the ring 17 or the ring-like protrusion 18 increases due to the function of the radial grooves 19.

Figure 5A:
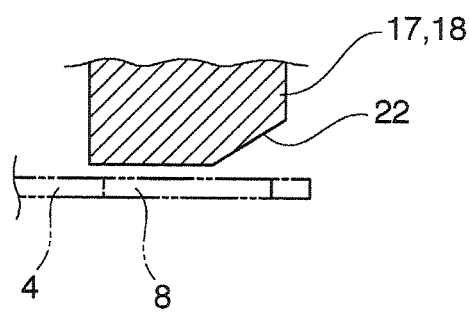
FIGS. 5A and 5B are descriptive diagrams showing an example of the cross-section structure of the ring or the ring-like protrusion of the present invention.
Figure 5B:
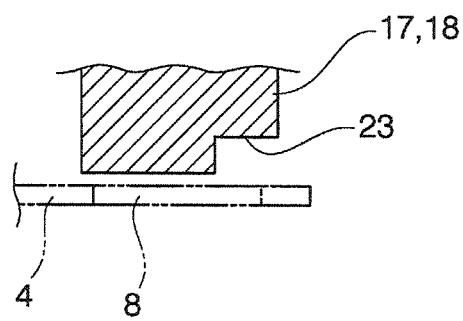

It should be noted that the cross-section structure of the ring 17 or the ring-like protrusion 18 according to the present invention is generally such a rectangular cross-section structure as shown in FIGS. 1 to 4D, but, for example, as shown in FIGS. 5A and 5B, a cross-section structure 5A having a slope 22 obtained by obliquely cutting an outer end of the face opposite the oil supply adjusting hole 8 of the partition plate 4, or a cross-section structure 5B having a step 23 obtained by cutting the outer end face side of the face opposite the oil supply adjusting hole 8 of the partition plate 4 in a stepping fashion provides approximately the same function or effect as the rectangular cross-section structure, of course.

In the highly reactive fluid fan coupling device thus configured, when the electromagnet 11 is in OFF (not excited), the armature 9-2 is separated from the magnetic loop element 10 by function of the leaf spring 9-1 so that the oil supply adjusting hole 8 is closed and supply of oil to the torque transmission chamber 6 is stopped, and when the electromagnet 11 is in ON (excited), the armature 9-2 is sucked to the side of the magnetic loop element 10 against the leaf spring 9-1, so that the leaf spring 9-1 is brought to pressure contact with the side of the case 2-1, so that the oil supply adjusting hole 8 is opened and oil is supplied to the torque transmission chamber 6, and then an appropriate amount of oil is supplied to the labyrinth mechanism 16, which results in torque transmission.

In the present invention, when the oil is supplied to the torque transmission chamber 6 by opening the oil supply adjusting hole 8 when the electromagnet 11 is in ON (excited), the oil scraping mechanism utilizing the non-Newtonian fluid characteristics of oil, namely, the ring 17 or the ring-like protrusion 18 provided on the rear face of the drive disk 3 rotates on the oil supply adjusting hole 8 of the partition plate 4, thereby scraping out the oil in the oil reservoir chamber 5 due to the non-Newtonian fluid characteristics of the oil, resulting in an increase in the supply amount of the oil supplied to the torque transmission chamber 6 through the oil supply adjusting hole 8. Therefore, according to the present invention, the supply amount of the oil supplied to the torque transmission chamber 6 increases even during low fan rotation, so that the reaction for increasing the fan rotation with the use of a control signal becomes quick.

EXAMPLES

Hereinafter, examples of the present invention will be described.

Example 1

Figure 6:
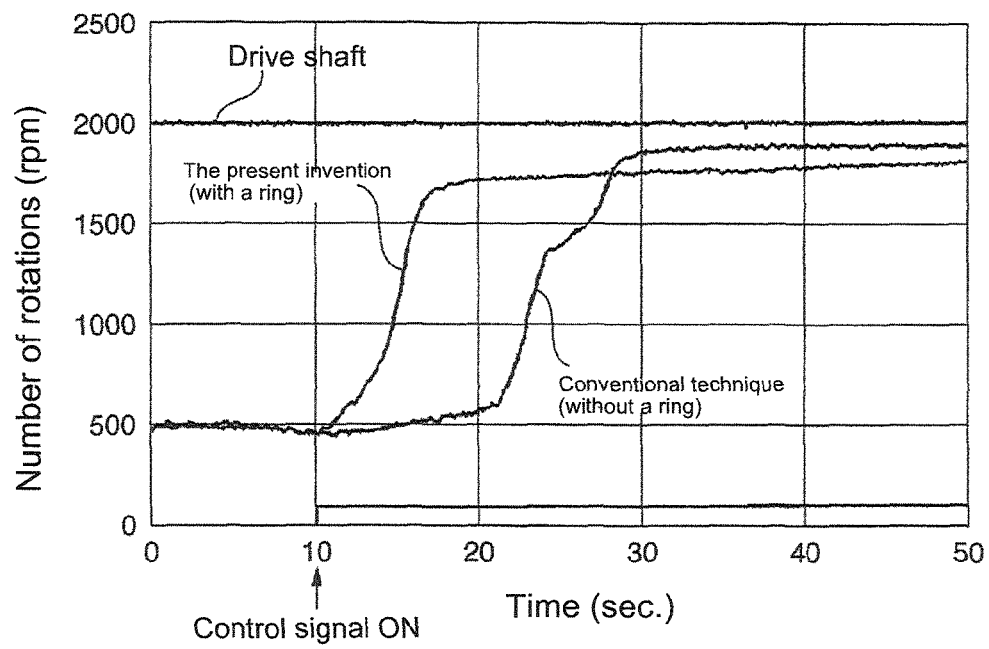
FIG. 6 is a graph showing the test result of the reaction rate up to torque transmission by excitation of an electromagnet at a time of normal OFF rotation (500 rpm) in Example 1 of the present invention.
Figure 7:
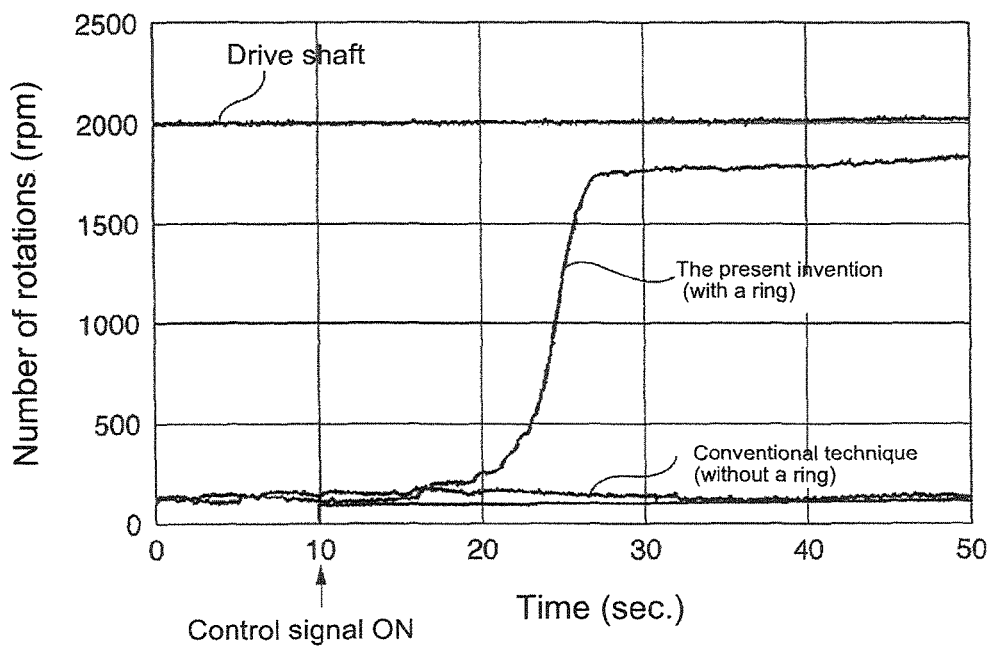
FIG. 7 is, similarly, a graph showing the test result of the reaction rate up to torque transmission from a state where control to OFF rotation (150 rpm) has been made assuming the problem in the snowplow by excitation of an electromagnet in Example 1 of the present invention.

The externally-controlled fluid-type fan coupling device shown in FIG. 1 was used, and the reaction rates up to torque transmission at a time of normal OFF rotation (500 rpm) by excitation of the electromagnet and from a state where control to OFF rotation (150 rpm) has been made assuming the problem in the snowplow vehicle by excitation of the electromagnet were adopted as test conditions, and the test results are shown in FIG. 6 (OFF rotation: 500 rpm) and FIG. 7 (OFF rotation: 150 rpm) while being compared with a conventional example (without the ring).

<Specifications of the Device>

Ring adopted (separate member)

A ring having a flat face formed with radial grooves therein shown in FIG. 4B (hereinafter, called "radially-grooved ring")

Clearance (gap) between the ring and the partition plate 0.3 mm

Viscosity of oil 12,500 cst

As is clear from the results shown in FIGS. 6 and 7, in the test of the normal OFF rotation (500 rpm), while the fan coupling device having the ring according to the present invention quickly reacted within 10 seconds after the control signal was turned on, the conventional fan coupling device having no ring took almost 20 seconds to react. In addition, in the test of the OFF rotation (150 rpm) assuming the problem of the snowplow vehicle, while the conventional fan coupling device having no ring hardly reacted, the fan coupling device having the ring according to the present invention quickly reacted within over 10 seconds after the control signal was turned on in the same manner as in the test of the normal OFF rotation (500 rpm). From these results, the effect of the ring of the present invention was confirmed.

Example 2

Figure 8:
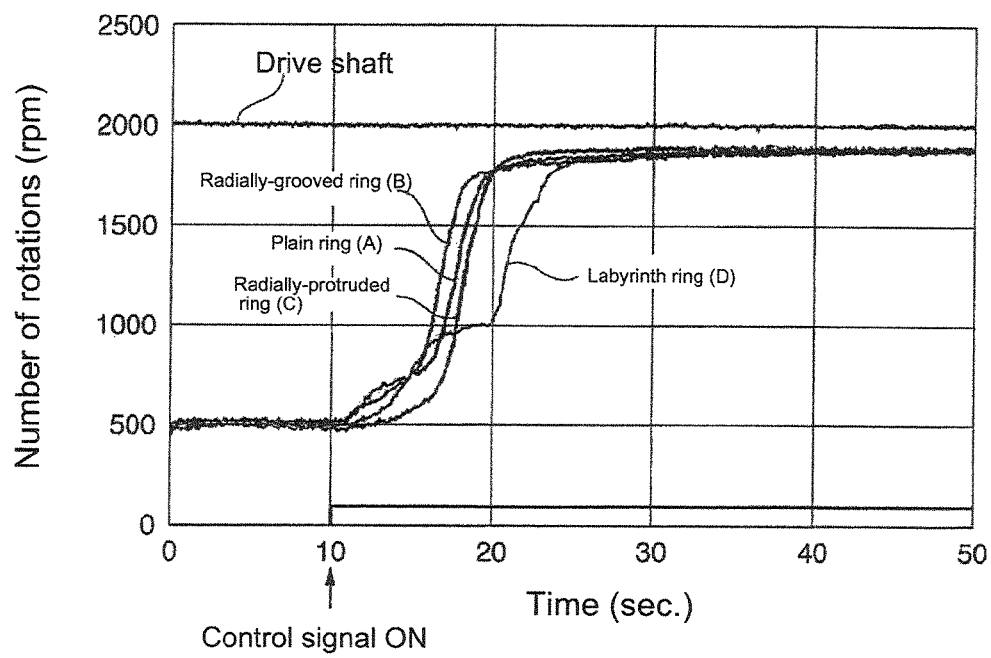
FIG. 8 is a graph showing the test result of the reaction rate up to torque transmission by excitation of an electromagnet at a time of normal OFF rotation (500 rpm) in Example 2 of the present invention.
Figure 9:
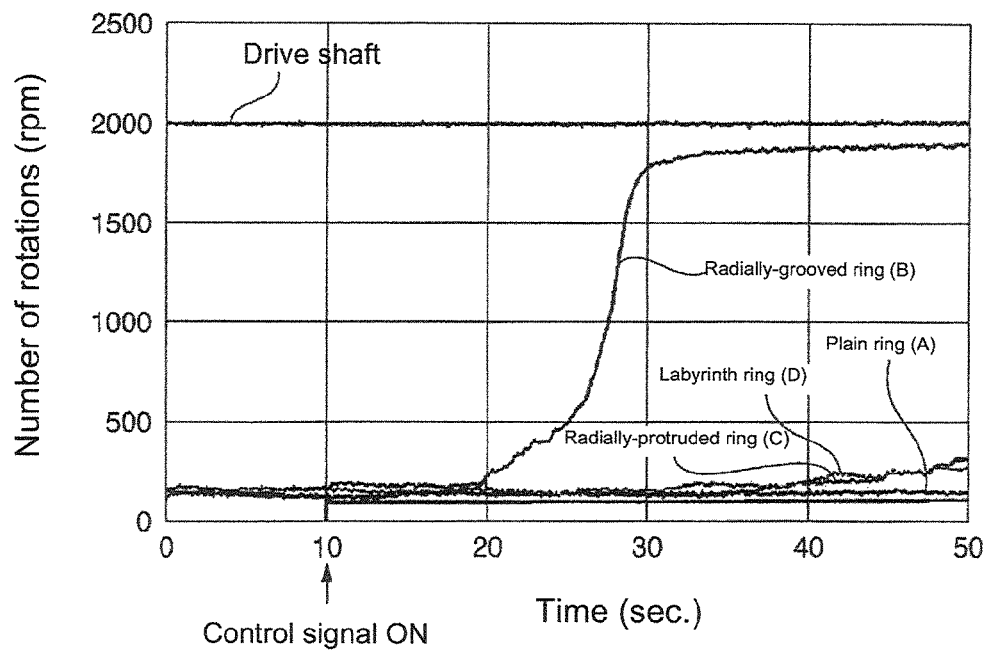
FIG. 9 is, similarly, a graph showing the test result of the reaction rate up to torque transmission from a state where control to OFF rotation (150 rpm) has been made assuming the problem in the snowplow by excitation of an electromagnet in Example 2 of the present invention.

The same externally-controlled fluid-type fan coupling device as in Example 1 was used, the respective effects of the following four types of rings of the present invention under the same test conditions as in Example 1 were compared with each other, and the results of comparison are shown in FIG. 8 (OFF rotation: 500 rpm) and FIG. 9 (OFF rotation: 150 rpm).
<Specifications of the Device>
  Rings employed (separate members)
  The four types of rings shown in FIGS. 4A to 4D: FIG. 4A showing a ring having a plain flat face (hereinafter, called "plain ring"); FIG. 4B showing a ring having a flat face formed with radial grooves therein (hereinafter, called "radially-grooved ring"); FIG. 4C showing a ring having a flat face formed with radial protrusions thereon (hereinafter, called "radially-protruded ring"); and FIG. 4D showing a ring having a flat face formed with a labyrinthine groove 21 therein (hereinafter called "labyrinthine ring").
  Clearance (gap) between the ring and the partition plate
  0.3 mm
  Viscosity of oil
  12,500 cst As is clear from the results shown in FIGS. 8 and 9, in the test of the normal OFF rotation (500 rpm), as shown in FIG. 8, all of the four types of rings (A) to (D) quickly reacted within over 10 seconds after a control signal was turned on, and, among them, the radially-grooved ring (B) reacted best. In addition, in the test of the OFF rotation (150 rpm) assuming the problem of the snowplow vehicle, as shown in FIG. 9, among the four types of rings (A) to (D), only the radially-grooved ring (B) reacted within 20 seconds, the other three types of rings (A), (C), and (D) did not reacted. This is thought to be because the radially-grooved ring (B) kept an adequate area close to and facing the oil supply adjusting hole, and discharged the oil successfully to the side of the ring outer periphery after scraping out the oil, but since an area of the radially-protruded ring (C) and the labyrinthine ring (D) which was close to and faces the oil supply adjusting hole was small, a scraped amount of oil is a small amount, while the plain ring (A) had the largest area close to and facing the oil supply adjusting hole but was not designed to discharge the oil to the side of the ring outer periphery after scraping out the oil, which resulted in stay of the oil in the clearance (gap) between the ring and the partition plate.

Example 3

Figure 10:
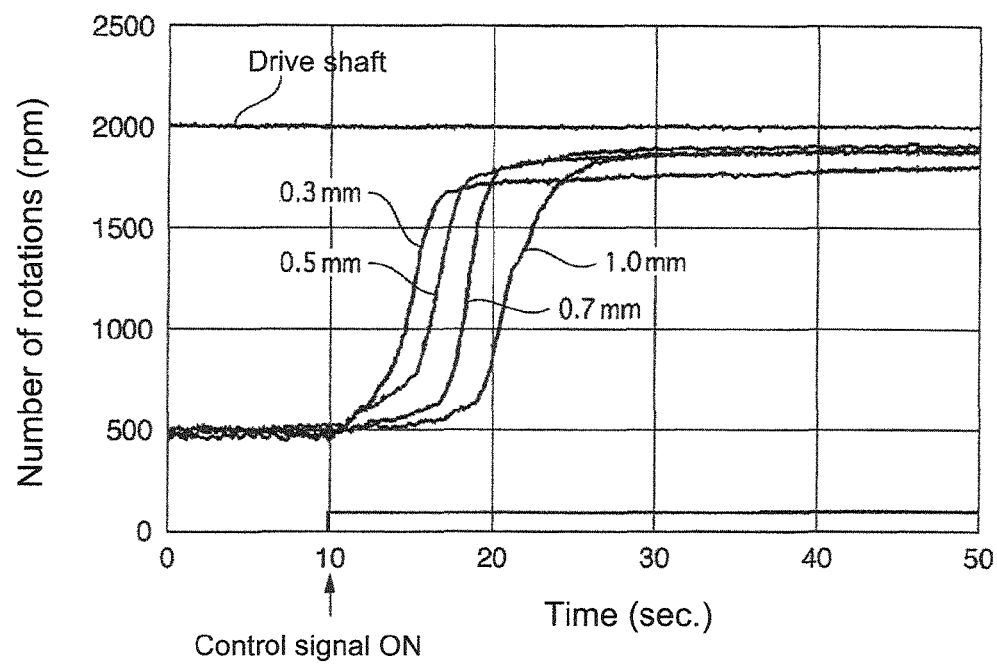
FIG. 10 is a graph showing the test result of the reaction rate up to torque transmission by excitation of an electromagnet at a time of normal OFF rotation (500 rpm) in Example 3 of the present invention.
Figure 11:
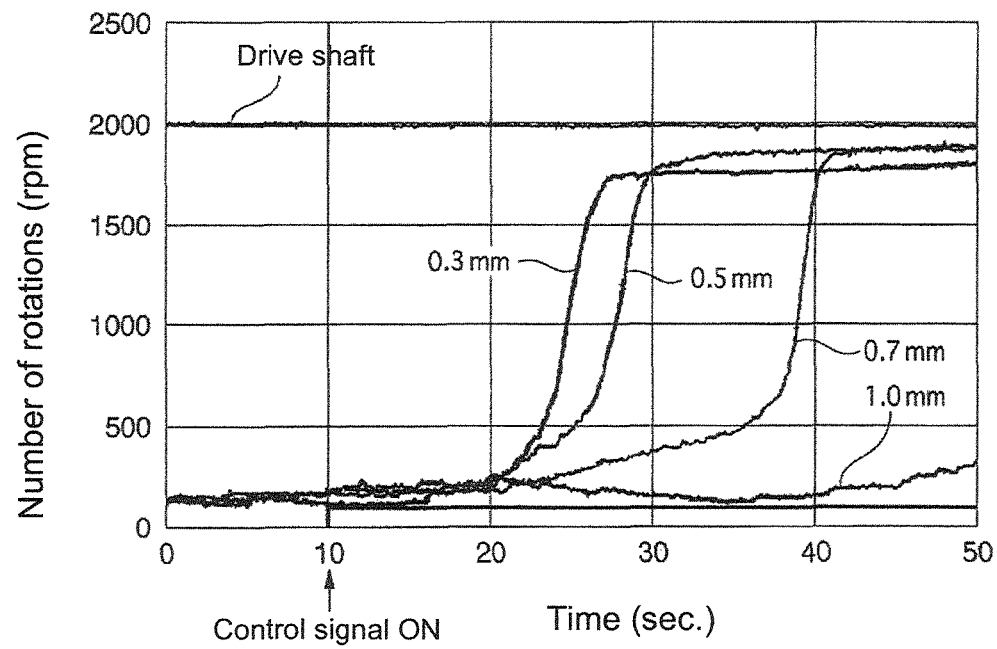
FIG. 11 is, similarly, a graph showing the test result of the reaction rate up to torque transmission from a state where control to OFF rotation (150 rpm) has been made assuming the problem in the snowplow by excitation of an electromagnet in Example 3 of the present invention.

The radially-grooved ring (B) was installed in the same externally-controlled fluid-type fan coupling device as in Example 1, the reaction rates of the fan coupling devices with different clearances (gaps) between the ring and the partition plate under the same test conditions were compared, and the results of comparison are shown in FIG. 10 (OFF rotation: 500 rpm) and FIG. 11 (OFF rotation: 150 rpm).
<Specifications of the Device>
  Ring adopted (separate member)
  The radially-grooved ring shown in FIG. 4B
  Clearance (gap) between the ring and the partition plate
  0.3 to 1.0 mm
  Viscosity of oil
  12,500 cst As is clear from the results shown in FIGS. 10 and 11, in the test of the normal OFF rotation (500 rpm), as shown in FIG. 10, the respective fan coupling devices with 0.3 mm, 0.5 mm, 0.7 mm, and 1.0 mm of clearances quickly reacted within over 10 seconds after a control signal was turned on, and, among them, the respective fan coupling devices with 0.3 mm, 0.5 mm, and 0.7 mm of clearances (gaps) between the ring and the partition plate particularly well reacted within 10 seconds after the control signal was turned on. In addition, even in the test of the OFF rotation (150 rpm) assuming the problem of the snowplow vehicle, the respective fan coupling devices with 0.3 mm, 0.5 mm, and 0.7 mm of clearances (gaps) between the ring and the partition plate reacted well. Under the condition that OFF rotation was controlled to 150 rpm, however, the 0.3 mm of clearance (gap) between the ring and the partition plate affected the maximum fan rotation, and the 0.5 mm of clearance (gap) can be expected to improve the reaction rate without sacrificing the maximum number of rotations.

It should be noted that though in Examples shown here the present invention was applied to an externally-controlled fluid-type fan coupling device of a system that used an electromagnet to control a valve member, even if the present invention is applied to a temperature-sensitive fluid fan coupling device, the same functional effect as above can be obtained, of course.

In the highly reactive fluid fan coupling device of the present invention, the drive disk in the torque transmission chamber is provided with the oil scraping mechanism utilizing the non-Newtonian fluid characteristics of oil, and thereby the ring or the ring-like protrusion that rotates with the drive disk functions to scrape out the oil in the oil reservoir chamber, so that the supply amount of oil to the torque transmission chamber is increased even during low fan rotation, speeding up of a reaction of fan rotation using a control signal can be achieved, and besides, the present invention is quite useful, for example, the present invention can be easily applied to an existing fluid-type fan coupling device.

The invention claimed is:

1. A fluid fan coupling device, comprising: a sealed housing; a partition plate in the housing and dividing the housing into an oil reservoir chamber and a torque transmission chamber, an oil supply adjusting hole being formed through the partition plate, the housing being supported through a bearing on a rotary shaft; a drive disk fixed at a distal end of the rotary shaft and being disposed in the torque transmission chamber; a dam being formed in a portion of an inner circumferential wall of the sealed housing opposite an outer circumferential wall portion of the drive disk for collecting and reservoiring oil when the housing is rotating; an oil circulating flow passage formed between the torque transmission chamber and the oil reservoir chamber; a valve member provided in the oil reservoir chamber in proximity to the oil supply adjusting hole, the valve member being configured for selectively opening or closing the oil supply adjusting hole of the partition plate so that rotation torque transmission from a drive side to a driven side is controlled by increasing or decreasing an effective contact area of oil in a torque transmission clearance formed between the drive side and the driven side; and a ring on the drive disk and extending radially outward from a location that is radially inward of the oil supply adjusting hole to a radially outer position that at least partly overlaps the oil supply adjusting hole, the ring projecting from the drive disk and toward the oil supply adjusting hole, whereby the ring functions to scrape out oil in the oil reservoir chamber by utilizing non-Newtonian fluid characteristics of the oil.

2. The fluid fan coupling device of claim 1, wherein the ring is a separate part provided on a rear face of the drive disk or is a protrusion integrally with the rear face of the drive disk.

3. The fluid fan coupling device of claim 2, wherein the ring has a flat face on a side facing the oil supply adjusting hole of the partition plate and is separated from the partition plate with a desired clearance.

4. The fluid fan coupling device of claim 2, wherein the ring has a radial groove in a face of the ring opposite the oil supply adjusting hole of the partition plate.

5. The fluid fan coupling device of claim 2, wherein the ring is made of metal, synthetic resin, or rubber.

6. The fluid fan coupling device of claim 3, wherein the ring has a radial groove in a face of the ring opposite the oil supply adjusting hole of the partition plate.

7. The fluid fan coupling device of claims 3, wherein the ring is made of metal, synthetic resin, or rubber.

8. The fluid fan coupling device of claim 4, wherein the ring is made of metal, synthetic resin, or rubber.

9. The fluid fan coupling device of claim 6, wherein the ring is made of metal, synthetic resin, or rubber.

10. The fluid fan coupling device of claim 1, wherein the ring extends to a position radially outward of the oil supply adjusting hole.

11. The fluid fan coupling device of claim 1, wherein the drive disk has no perforations therethrough.

\* \* \* \* \*